(12) United States Patent
Maehiro et al.

(10) Patent No.: US 8,197,339 B2
(45) Date of Patent: Jun. 12, 2012

(54) VIDEO GAME PROCESSING APPARATUS, A METHOD AND A COMPUTER PROGRAM PRODUCT FOR PROCESSING A VIDEO GAME

(75) Inventors: Kazutoyo Maehiro, Tokyo (JP); Hiroyuki Itou, Tokyo (JP)

(73) Assignee: Square Enix Co., Ltd., Tokyo (JP)

( * ) Notice: Subject to any disclaimer, the term of this patent is extended or adjusted under 35 U.S.C. 154(b) by 1412 days.

(21) Appl. No.: 11/460,263

(22) Filed: Jul. 27, 2006

(65) Prior Publication Data

US 2007/0026944 A1 Feb. 1, 2007

(30) Foreign Application Priority Data

Jul. 28, 2005 (JP) .................................. 2005-219692

(51) Int. Cl.
*A63F 9/00* (2006.01)
(52) U.S. Cl. .......................................................... 463/31
(58) Field of Classification Search ...................... 463/31
See application file for complete search history.

(56) References Cited

U.S. PATENT DOCUMENTS

| | | | |
|---|---|---|---|
| 5,880,709 A | 3/1999 | Itai et al. | |
| 6,210,273 B1 * | 4/2001 | Matsuno | 463/8 |
| 6,556,204 B1 | 4/2003 | Itai et al. | |
| 6,860,807 B2 | 3/2005 | Tsuchida | |
| 7,458,893 B2 * | 12/2008 | Hamano et al. | 463/36 |
| 2002/0103031 A1 * | 8/2002 | Neveu et al. | 463/49 |
| 2002/0183104 A1 * | 12/2002 | Takemoto et al. | 463/4 |
| 2003/0003999 A1 * | 1/2003 | Kobayashi | 463/43 |
| 2004/0044513 A1 * | 3/2004 | Kitahara | 703/17 |
| 2004/0110560 A1 | 6/2004 | Aonuma | |
| 2004/0176163 A1 * | 9/2004 | Ishihata et al. | 463/30 |
| 2004/0180709 A1 | 9/2004 | Takahashi et al. | |
| 2004/0209684 A1 * | 10/2004 | Hisano | 463/32 |
| 2004/0219964 A1 * | 11/2004 | Bleckley et al. | 463/13 |
| 2004/0259634 A1 * | 12/2004 | Machida | 463/29 |

(Continued)

FOREIGN PATENT DOCUMENTS

JP 8-069274 3/1996

(Continued)

OTHER PUBLICATIONS

English Language Abstract of JP 2003-010547.

(Continued)

*Primary Examiner* — Melba Bumgarner
*Assistant Examiner* — Seng H Lim
(74) *Attorney, Agent, or Firm* — Greenblum & Bernstein, P.L.C.

(57) ABSTRACT

Multiple characters in a video game can be displayed in a field so as to be easily distinguished, allowing the video game to proceed smoothly while maintaining realism. When an action content command and an action target character are received, a control section and a graphics processor carry out the control to display a target line for notifying the category of action in an action content specified by the action content command and a character that a player character specifies as the action target. In this way, by viewing an image in which a target line is in turn drawn from the player character to the target character, a player of the video game can quickly and easily recognize an action entity and an action target. This makes it possible to display the multiple characters in a field so as to be easily distinguished, and therefore, the video game can proceed smoothly while maintaining realism.

22 Claims, 7 Drawing Sheets

U.S. PATENT DOCUMENTS

| | | | |
|---|---|---|---|
| 2005/0187023 A1* | 8/2005 | Miyamoto et al. | 463/43 |
| 2005/0255900 A1* | 11/2005 | Takahashi et al. | 463/3 |
| 2005/0272506 A1* | 12/2005 | Sumi | 463/51 |
| 2006/0128468 A1* | 6/2006 | Yoshikawa et al. | 463/36 |
| 2008/0125202 A1* | 5/2008 | Kamiyama et al. | 463/1 |
| 2008/0139310 A1* | 6/2008 | Kando et al. | 463/33 |

FOREIGN PATENT DOCUMENTS

| | | |
|---|---|---|
| JP | 2003-010547 | 1/2003 |
| JP | 2003-019351 | 1/2003 |

OTHER PUBLICATIONS

English Language Abstract of JP 8-069274.
"Weekly Famitsu—Jul. 29, 2005 (Tales of Legendia)," Enterbrain Inc., vol. 20, No. 30, pp. 206-207.
English Language Abstract of JP 2003-019351.
Software Toolworks, "The Fidelity Chessmaster 2100", The Software Toolworks, Mindscape, Jan. 1, 1990, pp. 1-10.
Search report from E.P.O.in EP 06 01 5723, mail date is Mar. 7, 2011.

* cited by examiner

FIG. 5

CHARACTER INFORMATION TABLE EXISTING IN FIELD

| | HIT POINT | MAGIC POINT | CURRENT POSITION | AVAILABILITY OF ACTION TARGET | PROPERTY | STATUS EFFECT | |
|---|---|---|---|---|---|---|---|
| CHARACTER A | 200/350 | 80/120 | ... | P | FRIEND | | ........ |
| CHARACTER B | 286/315 | 0/0 | ... | AVAILABLE | FRIEND | | ........ |
| CHARACTER C | 250/280 | 280/320 | ... | AVAILABLE | FRIEND | | ........ |
| CHARACTER D | 80/80 | 0/0 | ... | AVAILABLE | ENEMY | | ........ |
| CHARACTER E | 80/80 | 0/0 | ... | AVAILABLE | ENEMY | POISON | ........ |
| CHARACTER F | 80/80 | 0/0 | ... | NO AVAILABLE | ENEMY | | ........ |
| CHARACTER G | 100/100 | 50/50 | ... | AVAILABLE | NEUTRAL | | ........ |
| CHARACTER H | 150/150 | 80/80 | ... | NO AVAILABLE | ENEMY | | ........ |
| ... | ... | ... | ... | ... | ... | ... | ........ |

FIG. 7

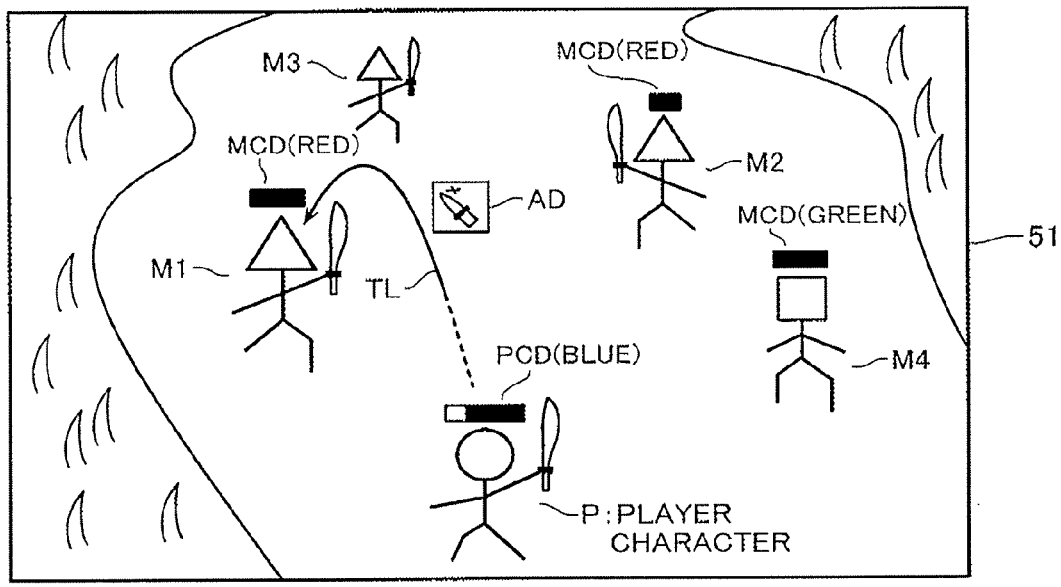

FIG. 8

TARGET LINE (TL)

| LINE COLOR | CONTENT |
|---|---|
| RED | CHARACTER AT STARTING POINT OF TL ATTACKS A CHARACTER POINTED OUT BY TL |
| BLUE | CHARACTER AT STARTING POINT OF TL SUPPLEMENTARILY ATTACKS A CHARACTER POINTED OUT BY TL |
| YELLOW | CHARACTER AT STARTING POINT OF TL SUPPLEMENTARILY PROTECTS A CHARACTER POINTED OUT BY TL |
| GREEN | CHARACTER AT STARTING POINT OF TL RESTORES A CHARACTER POINTED OUT BY TL |

VIDEO GAME PROCESSING APPARATUS, A METHOD AND A COMPUTER PROGRAM PRODUCT FOR PROCESSING A VIDEO GAME

CROSS-REFERENCE TO RELATED APPLICATION

The present disclosure relates to subject matter contained in Japanese Patent Application No. 2005-219692, filed on Jul. 28, 2005, the disclosure of which is expressly incorporated herein by reference in its entirety.

BACKGROUND OF THE INVENTION

1. Field of the Invention

The present invention relates to a technique for controlling progress of a video game by displaying multiple characters including a player character on an image display screen of an image display apparatus, and by controlling an action of the characters displayed on the image display screen in response to operation(s) by a player.

2. Description of the Related Art

Heretofore, various kinds of so-called role playing games (RPG; that is, a game in which a player plays a role of a character in a world of the game, and accomplishes a predetermined object while enjoying a process that the character grows through various experiences) have been provided.

In a RPG, generally, a player character acting in response to operations by the player wins a battle against an enemy character thwarting accomplishment of a predetermined object in the RPG, by which various benefits such as an experiential value are supplied to the player character. The battle against the enemy character has been an additional event to thwart the accomplishment of the predetermined object in the RPG. For this reason, a battle mode in which the player character battles the enemy character on a battle field has been provided in addition to a movement mode in which the player character is moved on a movement field, and the movement field and the battle field have been distinguished (separated) completely.

More specifically, for example, when predetermined battle mode shifting conditions are met while the player character is moved on the movement field, the movement field is shifted to the battle field. Namely, the scene that is displayed on the image screen (that is, scene) is shifted from the movement field to the battle field, and the player character and the enemy character(s) are displayed on the battle field in a state that they stand face to face. After the scene is shifted to the battle field, the scene is not returned to the movement field until the battle is terminated, and therefore, the player character cannot be moved on the movement field.

In this case, multiple friend characters including the player character and multiple enemy characters may be displayed on the battle field. When many characters are displayed on the battle field, it is difficult for the player to accurately grasp a state of each of the many characters displayed on the battle field. For this reason, the player may mistakenly operate, and the player character will not carry out an action intended by the player (for example, attack, recovery, supplemental defense, supplemental attack or the like), by which a problem that this lowers interest of the player may occur (that is, such mistaken operations may cause the player to lose interest in the game).

Heretofore, in order to make the player easily grasp the state of each of the characters displayed on the battle field, there is a technique in which a character (candidate character) to be a candidate of an action target of the player character and an action content of the player character against the candidate character (for example, any one of attack, recovery, supplemental defense and supplemental attack, or any one of an attack content, a recovery content, a supplemental defense content and a supplemental attack content) are received. In this technique, a display state in the vicinity of the candidate character is changed between the case where the received candidate character is an enemy character and the case where it is a character other than an enemy character (for example, see Japanese Patent Application Publication No. 2003-10547).

Further, heretofore, in order to allow a player to identify the characters displayed on the image display screen more easily and quickly, there is another technique in which a size of a circular shaped cursor displayed on the image display screen is being reduced so as to specify a character, the degree of zoom up to the character specified by the cursor is increased, and the display state of the cursor is changed in response to progress of an image processing state with respect to the character (for example, see Japanese Patent Application Publication No. 8-69274).

In the conventional techniques described above, the battle field and the movement field are provided separately. For this reason, in the case where the battle mode shifting conditions are met while the player character is moved on the movement field, the scene is shifted from the movement field to the battle field in each case. Therefore, there is a problem that realism (realistic sensation) may be lost in the video game.

Further, in the case where the battle mode shifting conditions are met while the player character is moved on the movement field, the player has to wait until the period of time required to switch the fields (for example, the period of time obtained by adding the period of time for switching the scenes and the period of time until an initial event is carried out in the battle mode) elapse, and therefore, there is a problem that the video game cannot proceed smoothly.

On the other hand, in particular, the RPG requires, during a battle, that selection of an enemy character as an attack target and an attack content be received, and that an action of the received attack content be carried out against the received enemy character. Thus, the movement field and the battle field cannot be unified simply. Namely, it is difficult to distinguishably display whether a character arbitrarily appearing during movement is a character to be an attack target or not, which kind of character the character that the player character battles is, which kind of character the character that the player character does not battle is, and the like in a movable field in the RPG.

In this regard, although there is a video game called as an action RPG, in which a player character battles an enemy character in real time by providing an action performance to a RPG as well as an action video game, the RPG is different from such an action RPG. Namely, since a battle is carried out by means of a turn system in which a player character side and enemy characters attack another character, for example, alternately, and/or a battle system called as an active time battle in which the attack order of each character is determined by time management, the movement field and the battle field cannot be easily unified.

In Japanese Patent Application Publication No. 2003-10547, the display state in a vicinity of a candidate character is displayed so as to be changed between a case where the received candidate character is an enemy character and a case where it is another character other than enemy characters. The patent application, however, does not investigate whether an enemy character is displayed on the movable field so as to be distinguishable.

In Japanese Patent Application Publication No. 8-69274, a character is identified by a cursor and a degree of zoom up of the character. Thus, the character is distinguished by the display state of the cursor. The patent application, however, does not investigate whether an enemy character is displayed on the movable field so as to be distinguishable.

SUMMARY OF THE INVENTION

It is one object of the present invention to solve the problems described above and to provide a video game processing apparatus, a method and a computer program product for processing a video game by which multiple characters in the video game can be displayed in a common field in which both movement and a battle are carried out so as to be distinguished easily, and thereby allowing the video game to proceed (make progress) smoothly while maintaining realism.

In order to achieve the above object, one aspect of the present invention is directed to a video game processing apparatus that causes an image display apparatus to display multiple characters of a video game, including a player character, on an image display screen (for example, an image display screen 51) of the image display apparatus (for example, a display device 50). The video game processing apparatus (for example, a video game apparatus main body 10, a video game apparatus 100) controls progress of the video game by controlling an action of each character to be displayed on the image display screen in accordance with operations by a player. The video game processing apparatus according to an aspect of the present invention includes a character image display controller (for example, a process at Step S116 executed by a control section 11 and a graphics processor 15) that causes the image display apparatus to display a character image in which the characters existing within a field of view of a virtual camera in a field are drawn. In this case, various actions, including movement of the player character and a battle by the player character, (for example, movement, attack, defense, recover, and/or the like) are allowed in the field, and a same time base is applied to the multiple characters, including the player character, which exist in the field.

The video game processing apparatus may also include an action target candidate identifying image drawer (for example, processes at Steps S115 and S116 executed by the control section 11 and the graphics processor 15) that draws an action target candidate identifying image (for example, a character identifying information image) in the character image displayed by the character image display controller. In this case, the action target candidate identifying image is used to notify that characters, which meet predetermined action target conditions, are action target candidate characters.

The video game processing apparatus may also include an action content receiver (for example, a process at Step S131 executed by the control section 11) that receives an action content for the player character.

The video game processing apparatus may also include an action target receiver (for example, a process at Step S132 executed by the control section 11) that receives selection of an action target character from the action target candidate characters to be an action target in the case where the action content received by the action content receiver requires the action target.

The video game processing apparatus may also includes an action content beforehand notifying image drawer (for example, a process at Step S133 executed by the control section 11 and the graphics processor 15) that draws an action content beforehand notifying image (for example, an image indicating a target line) in the character image displayed by the character image display controller. In this case, the action content beforehand notifying image beforehand notifies that the action content received by the action content receiver will be executed against the action target character received by the action target receiver.

The video game processing apparatus may also includes an action content executing image drawer (for example, a process at Step S137 executed by the control section 11 and the graphics processor 15) that draws an action content executing image (for example, an action executing image) in the character image displayed by the character image display controller. In this case, the action content executing image notifies an execute state that the action content received by the action content receiver is executed against the action target character received by the action target receiver.

Since the video game processing apparatus may have the configuration described above, multiple characters in a video game can be displayed in a common field in which both movement and a battle are carried out so as to be easily distinguished. Thus, a video game can proceed smoothly while maintaining realism thereof.

It is preferable that the action content executing image drawer draws an action content executing image (for example, an image in which the player character is moved) that notifies only the execute state of the action content received by the action content receiver in the case where the action content received by the action content receiver does not require an action target. This makes it possible to carry out the action content that does not need an action target, while also carrying out the movement and the battle in a common field.

It is preferable that the action target candidate identifying image drawer draws the action target candidate identifying image (for example, character identifying information images each having a different color) that may further include a property (for example, any one of a friend, an enemy and a neutral) for each of the action target candidate characters. By constructing the video game processing apparatus in this manner, it is possible to recognize the property of each character easily.

In an aspect of the present invention, the predetermined action target conditions may be met in the case where the distance between the action target candidate character and the player character is within a predetermined distance or range (for example, a distance where the player character can attack an enemy). By constructing the video game processing apparatus in this manner, it is possible for a player to easily recognize each character displayed in the field in detail. In particular, since it is constructed so that the action target conditions are met when the player character is within an attackable distance, it is possible for a player to easily and accurately recognize whether or not each character displayed in the field is a character that the player character can specify as an attack target.

It is preferable that the action content beforehand notifying image (for example, an image indicating a target line separated by color on the basis of the category of action content) notifies a player that the action content received by the action content receiver is a predetermined category of action content (for example, a category such as attack, defense, and recover). By constructing the video game processing apparatus in this manner, it is possible for a player to recognize not only an action target character but also to easily and accurately recognize the category of action content easily and accurately, and this makes it possible to easily recognize a more detailed state of the action.

It is preferable that the action content beforehand notifying image (for example, an image indicating a target line separated by color on the basis of the category of action content) is a straight line or a curved line that is in turn drawn from a vicinity of the player character to a vicinity of the action target character received by the action target receiver continuously or intermittently, and the straight line or curved line has a predetermined display state (for example, color, line style, and the size of line), by which the predetermined category of action content is notified. Since the video game processing apparatus is constructed in this manner, it is possible to easily distinguish the action target character by the straight line or curved line that is in turn drawn from the vicinity of the player character to the vicinity of the action target character received by the action target receiver continuously or intermittently. Further, since it is possible for the player to easily distinguish the category of action content by the display state of the straight line or curved line, it is possible for the player to more easily recognize the detailed state of the action.

It is preferable that the action content beforehand notifying image drawer draws the action content beforehand notifying image (for example, an image indicating target line adding information) so as to notify the action content received by the action content receiver as it is. By constructing the video game processing apparatus in this manner, it is possible for the player to easily and accurately recognize not only an action target character but also the action content as it is, and this makes it possible for the player to easily recognize the more detailed state of the action.

It is preferable that the action content beforehand notifying image is a straight line or curved line that is in turn drawn from a vicinity of the player character to a vicinity of the action target character received by the action target receiver continuously or intermittently, and that the action content beforehand notifying image drawer further draws an action content image indicating the action content as it is in the vicinity of the straight line or curved line, by which the action content received by the action content receiver is notified. Since the video game processing apparatus is constructed in this manner, it is possible for the player to easily distinguish the action target character by the straight line or curved line that is in turn drawn from the vicinity of the player character to the vicinity of the action target character received by the action target receiver continuously or intermittently. Further, since it is possible for the player to easily distinguish the action content as it is by the action content image displayed in the vicinity of the straight line or curved line, it is possible to more easily recognize the detailed state of the action.

It is preferable that the video game may be a role playing game, and that the video game processing apparatus further includes a time determiner (for example, processes at Steps S135 and S136 executed by the control section 11) that controls progress of the role playing game. The time determiner determines whether a predetermined period of time elapses after the time when the action target receiver receives the action target character and the action content receiver receives the action content. Alternatively, the time determiner may determine whether a predetermined period of time elapses after the time when the character image display controller causes the image display apparatus to display the action content executing image drawn by the action content executing image drawer. The action content executing image drawer draws the action content executing image (for example, Step S137), for example, in the case where the time determiner determines that the predetermined period of time elapses (for example, "Yes" at Step S136). By constructing the video game processing apparatus in this manner, in a role playing game in which an action content is carried out in turn from a character that meets a predetermined condition(s) (that is, a character whose WTG (or "ATG") is filled up in the case where a battle is carried out by a battle system called as an active time battle), it is possible to display multiple characters in a common field in which both movement and a battle are carried out so as to be distinguished easily (distinguishable). Therefore, the video game can proceed smoothly while maintaining realism thereof.

Further, in another aspect of the present invention, the present invention is directed to a method of processing a video game by causing an image display apparatus to display multiple characters of the video game including a player character on an image display screen of the image display apparatus. In this case, the method controls progress of the video game by controlling an action of each character displayed on the image display screen in accordance with operations by a player. The method of the present invention includes making the image display apparatus display a character image in which the characters existing within the field of view of a virtual camera in a field are drawn (for example, Step S116). In this case, various actions including the movement of the player character and a battle by the player character are allowed in the field, and a same time base is applied to the multiple characters, including the player character, which exist in the field.

The method may also include drawing an action target candidate identifying image in the character image (for example, Step S116 on the basis of Step S122). In this case, the action target candidate identifying image may be used to notify the player that characters, which meet predetermined action target conditions, are action target candidate characters.

The method may also include receiving an action content for the player character (for example, Step S131).

The method may also include receiving selection of an action target character from the action target candidate characters to be an action target in the case where the received action content requires the action target (for example, Step S132).

The method may also include drawing an action content beforehand notifying image in the character image (for example, Step S133). In this case, the action content beforehand notifying image beforehand notifies the player that the received action content will be executed against the received action target character.

The method may also include drawing an action content executing image in the character image (for example, Step S137). In this case, the action content executing image notifies the player of an execute state, for example, that the received action content is executed against the received action target character.

Moreover, still another aspect of the present invention is directed to a computer program product for processing a video game. Progress of the video game is controlled by causing an image display apparatus to display multiple characters of the video game including a player character on an image display screen of the image display apparatus, and controlling an action of each character to be displayed on the image display screen in accordance with operations by a player. The computer program product causes a computer (for example, the video game apparatus main body 10, and video game apparatus 100) to execute steps including causing the image display apparatus to display a character image in which the characters existing within the field of view of a virtual camera in a field are drawn (for example, Step S116). In this case, various actions including the movement of the player character and a battle by the player character are allowed in the field, and a same time base is applied to the characters, including the player character, which exist in the field.

The steps also include drawing an action target candidate identifying image in the character image (for example, Step S116 on the basis of Step S122). In this case, the action target candidate identifying image is used to notify a player that characters, which meet predetermined action target conditions, are action target candidate characters.

The steps also include receiving an action content of the player character (for example, Step S131).

The steps also include receiving selection of an action target character from the action target candidate characters to be an action target in the case where the received action content requires the action target (for example, Step S132).

The steps also include drawing an action content beforehand notifying image in the character image (for example, Step S133). In this case, the action content beforehand notifying image beforehand notifies the player that the received action content will be executed against the received action target character.

The steps also include drawing an action content executing image in the character image (for example, Step S137). In this case, the action content executing image notifies the player of an execute state, for example, that the received action content is executed against the received action target character. The exemplary computer program is not limited to use with a computer, but may be used, with any electronic apparatus capable of carrying out an aspect of the invention without departing from the scope or spirit of the invention, as those of skill in the art will readily recognize.

According to the present invention, multiple characters in the video game can be displayed in a common field in which both movement and a battle are carried out so as to be easily distinguishable by a player, thereby allowing the video game to proceed smoothly while maintaining realism thereof.

BRIEF DESCRIPTION OF THE DRAWINGS

The foregoing and other objects, features and advantages of the present invention will become more readily apparent from the following detailed description of preferred embodiments of the present invention that proceeds with reference to the appending drawings.

FIG. 3 is a flowchart that illustrates an example of a process for determining character identifying information and the like.

FIG. 5 is an explanatory drawing that shows an example of an information table for characters existing in a field.

FIG. 7 is an explanatory drawing that shows an example of a display state of a target line drawn from a player character (attacking entity) to an enemy character (attack target).

FIG. 8 is an explanatory drawing that shows an example of action types distinguished by the color of a target line.

DETAILED DESCRIPTION OF THE INVENTION

Preferred embodiments of a video game processing apparatus, a method and a computer program product for processing a video game according to the present invention will be described in detail with reference to the appending drawings.

Figure 1:
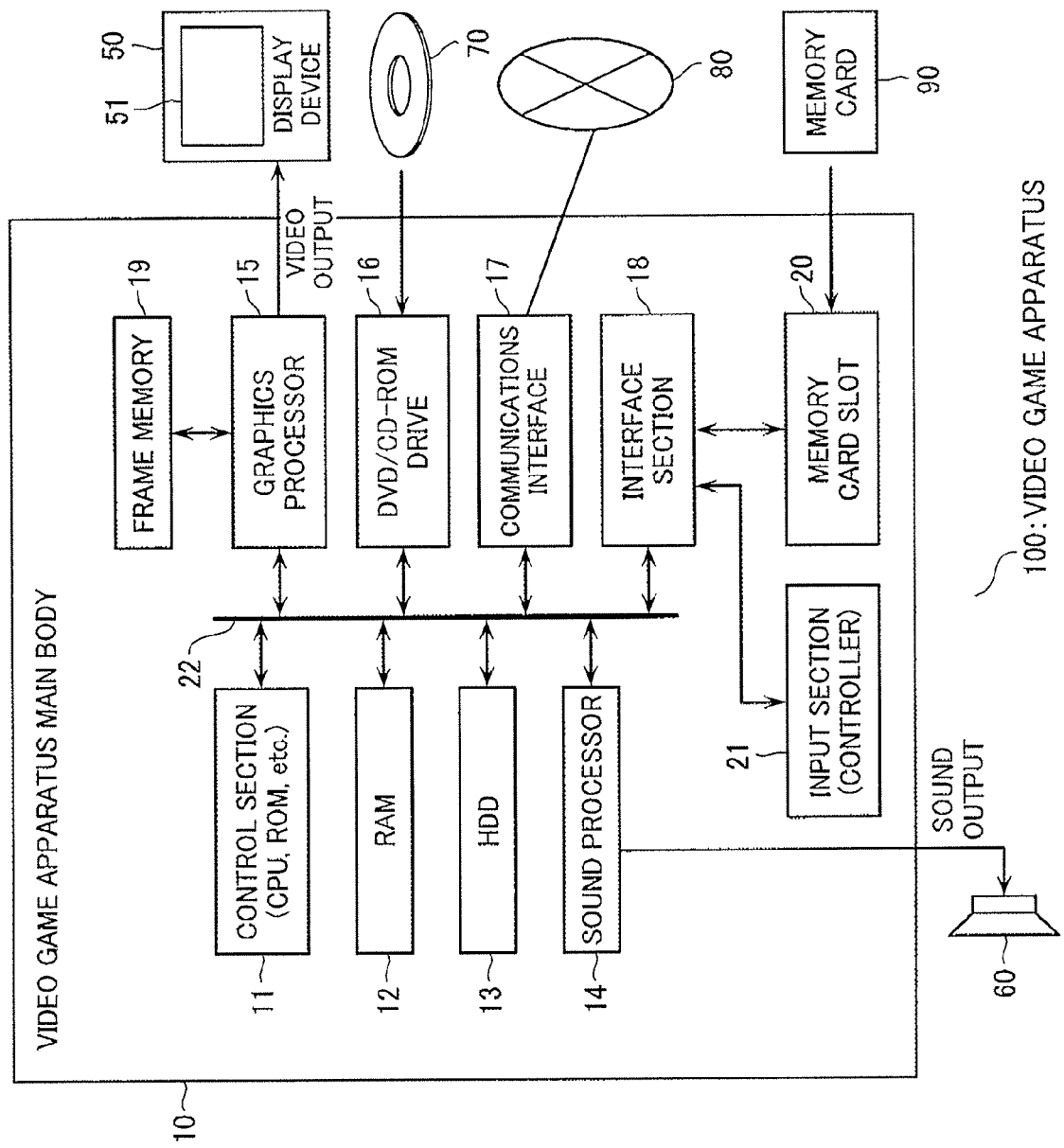
FIG. 1 is a block diagram that illustrates an example of a configuration of a video game apparatus to which an embodiment of the present invention is applied.

FIG. 1 is a block diagram that illustrates a configuration of a video game apparatus 100 to which an embodiment of the present invention is applied. However, those skilled in the art will readily recognize that other devices may be used without departing from the spirit or scope of the invention.

As shown in FIG. 1, a video game apparatus 100 of this embodiment includes a video game apparatus main body 10, a display device 50, and a sound output device 60. The video game apparatus main body 10 is constituted from a video game system that is put on the market, for example. Further, the display device 50 is constituted from, for example, a television apparatus, a liquid crystal display device, a micromirror device, a holographic display device, or any combination thereof. The display device 50 is provided with an image display screen 51. However, those skilled in the art will readily recognize that any device capable of generating or reproducing an image may be used without departing from the scope or spirit of the invention.

The video game apparatus main body 10 includes a control section 11, a RAM (Random Access Memory) 12, a HDD (hard disk drive) 13, a sound processor 14, a graphics processor 15, a DVD/CD-ROM drive 16, a communications interface 17, an interface section 18, a frame memory 19, a memory card slot 20, and an input section (controller) 21.

Each of the control section 11, the RAM (Random Access Memory) 12, the HDD (Hard Disc Drive) 13, the sound processor 14, the graphics processor 15, the DVD/CD-ROM drive 16, the communications interface 17 and the interface section 18 is connected to an internal bus 22.

The control section 11 includes a CPU (Central Processing Unit), ROM (Read Only Memory) and the like, and carries out control of the whole video game apparatus 100 in accordance with control programs stored in the HDD 13 and/or a storage medium 70. The control section 11 includes an internal timer used to generate timer interruption. The RAM 12 may be used as a work area for the control section 11. The HDD 13 is a storage region for storing the control programs and various data.

The sound processor 14 is connected to a sound output device 60, which includes a speaker, for example, but may include any other device capable of generating or reproducing an audible signal. The sound processor 14 outputs a sound signal to the sound output device 60 in accordance with a sound outputting command from the control section 11 that carries out a process according to the control programs. In this regard, the sound output device 60 may be embedded in the display device 50 or the video game apparatus main body 10, or may be affixed to a vibrating surface that may be caused to generate the audible signal.

The graphics processor 15 is connected to the display device 50 including the image display screen 51 on which an image is displayed. However, those skilled in the art will readily recognize that the graphics processor may be coupled to other known types of display devices, such as a head-mounted display, a holographic three-dimensional display or the like, without departing from the spirit or scope of the invention. The graphics processor 15 develops an image on the frame memory 19 in accordance with a graphics command from the control section 11, and outputs video signals for displaying the image on the image display screen 51 to the display device 50. A switching time for images to be displayed according to the video signals is set to $1/30$ seconds per frame, for example. However, the switching time may be any other frame rate as those skilled in the art will appreciate without departing from the spirit or scope of the invention.

A storage medium 70 such as a DVD-ROM medium and a CD-ROM medium in which control programs for a game are stored is mounted in the DVD/CD-ROM drive 16. The DVD/CD-ROM drive 16 carries out a process for reading out various data such as control programs from the storage medium 70.

The communications interface 17 is connected to a communication network 80 such as the Internet, for example, in a wireless or wired manner. The video game apparatus main body 10 carries out communication with, for example, another computer via the communication network 80 using a communication function of the communications interface 17.

Each of the input section 21 and the memory card slot 20 is connected to the interface section 18. The interface section 18 causes the RAM 12 to store instruction data from the input section 21 on the basis of operation of the input section 21 by a player of the video game apparatus 100. In response to the instruction data stored in the RAM 12, the control section 11 carries out various arithmetic processing.

The input section 21 is constituted from, for example, a controller for a video game apparatus 100, and includes multiple operational buttons (operational keys) such as a directional instruction key and various selection keys. In the present embodiment, when a player (that is, a user of the video game apparatus 100) operates the directional instruction key, a player character (to be described later) is virtually moved. Further, operation of the various selection keys by the player causes the control section 11 to generate various commands such as a battle command and to carry out a predetermined process according to the scene displayed on the image display screen 51. In this regard, the directional instruction key is used to move a cursor and the like.

Further, the interface section 18 carries out, according to command(s) from the control section 11, a process to store data indicative of the progress of a game stored in the RAM 12 into the memory card 90 installed in the memory card slot 20. The interface section 18 also carries out a process to read out data on the game stored in the memory card 90 at the time of suspending the game and to transfer such data to the RAM 12, and the like.

Various data, such as control program data for performing the game with the video game apparatus 100, are stored in, for example, the storage medium 70. The various data, such as the control program data stored in the storage medium 70, are read out by the DVD/CD-ROM drive 16 in which the storage medium 70 is installed, and the data thus read out are loaded onto the RAM 12. The control section 11 carries out, in accordance with the control program loaded on the RAM 12, various processes such as a process to output the drawing or graphics command to the graphics processor 15, and a process to output the sound outputting command to the sound processor 14. In this regard, the interim data generated in response to the progress of the game (for example, data indicative of scoring of the game, the state of a player character and the like) are stored in the RAM 12 used for a work memory while the control section 11 carries out processing.

It is assumed that a three-dimensional video game according to an aspect of the present embodiment is a game wherein multiple characters, including a player character (that is, a character that moves in accordance with the operation of the input section 21 by the player, which will be described later), move on a field provided in a virtual three-dimensional space, by which the game proceeds. In this regard, it is assumed that the virtual three-dimensional space in which the field is formed is indicated by coordinates of the world coordinate system. The field is defined by multiple surfaces, and coordinates of vertexes of the respective constituent surfaces are shown as characteristic points.

Next, an operation of the video game apparatus 100 according to an aspect of the present embodiment will now be described.

Here, in order to simplify the explanation, it is assumed that only a single player character P and multiple non-player characters (which are not moved in response to operation of the player, but are moved in accordance with control of the video game apparatus 100 (more specifically, control of the control section 11), and hereinafter, referred to simply as "NPC") exist as objects that are movable in the virtual three-dimensional space. Explanations for any process other than the processes relating to the present invention are omitted, in particular. In this regard, in the present embodiment, video game control for a RPG is carried out.

Figure 2:
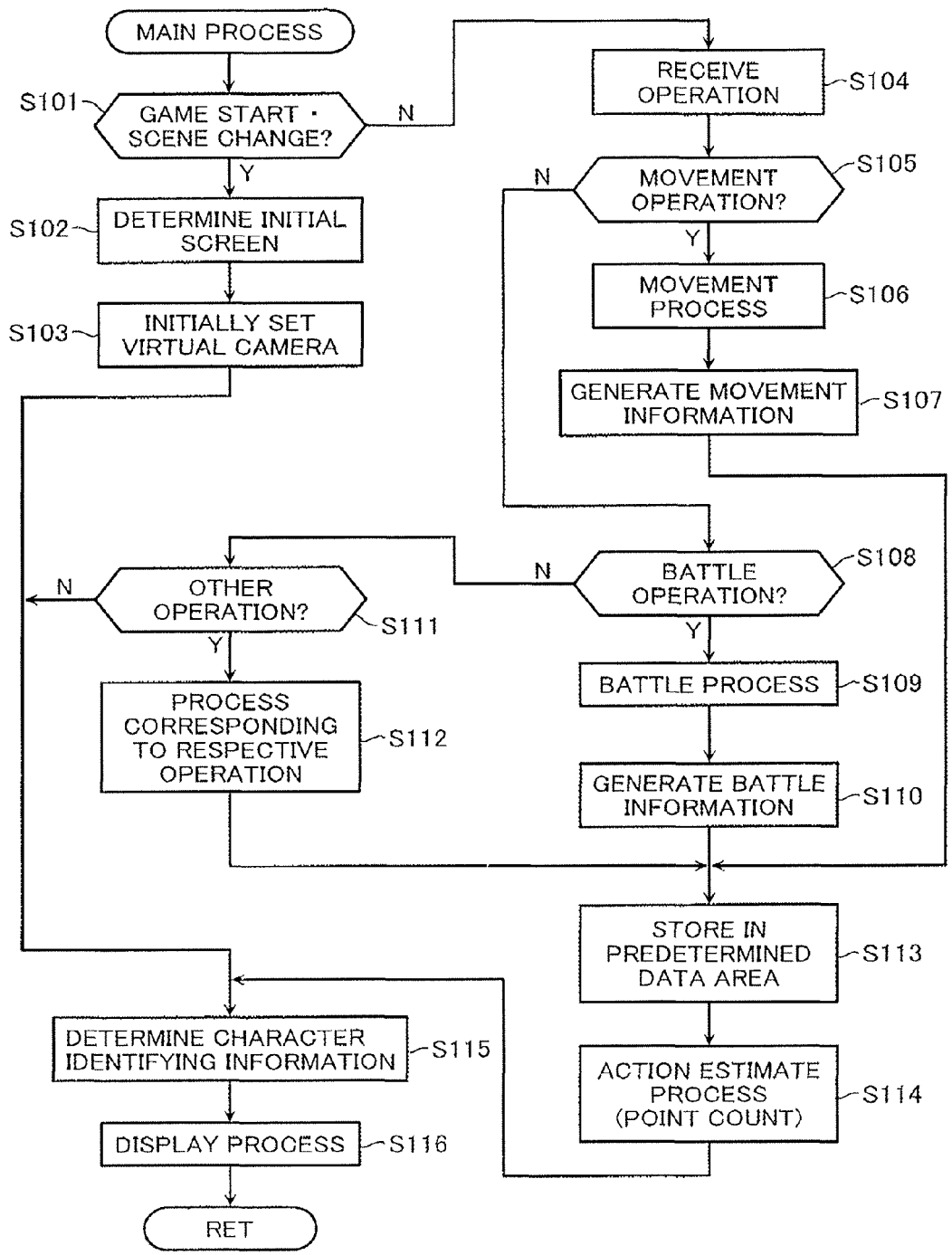
FIG. 2 is a flowchart that illustrates an example of a main process.

FIG. 2 is a flowchart that illustrates an example of a main process of the video game apparatus 100 according to the present embodiment. The main process is a process for generating an image for one frame and a process required for the control of the video game, and is carried out in accordance with timer interruption at every 1/30 second. It is to be noted that timing of "at every 1/30 second" is one example, as mentioned before. For example, the main process may be carried out in accordance with timer interruption at every single field period (every 1/60 second) or at every two frame periods (every 1/15 second).

In the present embodiment, a game (that is, RPG) proceeds in a common field in which various actions, including movement of the player character and a battle by the player character, are allowed. In the case where a predetermined object in the field is accomplished, one stage may be terminated and the processing may proceed to another stage carried out in a next field. Further, in the present embodiment, the same time base is applied to the respective characters existing in such a field. Once a NPC enters the stage in the field, the NPC moves on the field or stands still on the field in accordance with the same time base until a hit point (which is a value indicating life force, and hereinafter, referred to simply as "HP") thereof becomes zero. In this case, a portion displayed on the image display screen 51 as a character image is a portion that exists within the field of view of a virtual camera in the field.

In the main process, the control section 11 determines whether an instruction to start a game is generated by the operation of the input section 21 by means of the player or not in the case where the state is still before the game start. Once the game is in an execution state, the control section 11 determines whether a timing state is reached to change the scene (for example, change the field) (Step S101). The timing state to change the scene is, for example, the time at which a virtual three-dimensional space, illustrating a new scene, is displayed on the image display screen 51 in order to finish the scene that has been displayed on the image display screen 51 until now (for example, a scene displayed by a virtual three-dimensional space, and a scene displayed by a directorial moving image) and to switch the displayed scene to the new scene.

In the case where it is determined that an instruction to start a game is generated, or that the timing state reaches a state to change the scene ("Yes" at Step S101), the control section 11 determines an initial screen (initial screen at the time of start of the game, or initial screen at the time of change in the scene) in accordance with the control program (Step S102). In this case, various data, such as image data used for the game and characters, are stored in the storage medium 70. At Step S102, an initial display position of the player character in an initial screen or a scene after a scene change (for example, a new stage), a NPC or NPCs to be displayed, an initial display position of each of the NPCs to be displayed and the like are determined in accordance with the control program.

Subsequently, the control section 11 determines a viewpoint position of a virtual camera, a direction of a visual axis, and a size of a visual angle in accordance with the control program. The control section 11 then carries out an initial setup for the virtual camera to execute perspective transformation (Step S103). Then, the processing flow proceeds to Step S115.

On the other hand, in the case where it is determined that the game is executed and it is not time to change the scene ("No" at Step S110), the control section 11 receives instruction data in accordance with the operation of the input section 21 by the player (Step S104). Namely, the control section 11 determines whether instruction data for executing movement of a player character or the like is inputted from the input section 21. In the case where effective instruction data (that is, it means that such effective instruction data is instruction data that is allowed to be received by the control section 11) is inputted, the control section 11 receives the effective instruction data.

In the case where the control section 11 receives instruction data for instructing an action of the player character relating to the movement of the player character (that is, movement instruction data: movement instruction by a movement command or the directional instruction key) in accordance with the operation of the input section 21 by the player relating to the movement of the player character (movement operation) at Step S104 ("Yes" at Step S105), the control section 11 executes a movement process in accordance with the movement instruction data thus received (Step S106). In the movement process, the control section 11 causes the position of the player character to move in a virtual space (on the present field) in accordance with the received movement instruction data. In this regard, such a movement command may include a dash instruction command, for example. The dash instruction command is a command to move the player character quickly, and a command for supplying an instruction that the player character goes away (or runs away) from a battle area quickly if the player character is during melee, for example.

Subsequently, the control section 11 generates movement information on the basis of the position information of the player character derived along with the movement process (Step S107). Namely, in accordance with the movement of the position of the player character by means of the movement process, the control section 11 updates necessary data among data on the viewpoint position of the virtual camera, data on the direction of a visual axis, and data on the size of a visual angle. The control section 11 then changes the setting content of the virtual camera. The movement information includes various kinds of information on the movement such as the viewpoint position of the virtual camera, the direction of the visual axis, and the size of the visual angle changed along with the position of the player character after the movement, as well as information on the movement of the player character. Then, the processing flow proceeds to Step S113.

In the case where the control section 11 receives instruction data for instructing an action regarding a battle (that is, battle instruction data: a battle command) in accordance with an operation of the input section 21 by the player for instructing the action of the player character regarding the battle (battle operation) at Step S104 ("Yes" at Step S108), the control section 11 executes a battle process in accordance with the received battle instruction data (Step S109). In the battle process, the control section 11 executes, for example, a process to determine a battle result and/or battle development between an enemy character (that is, a non-player character to battle against) and the player character, and the like.

Subsequently, the control section 11 generates battle information on the basis of the battle result and/or battle development determined by means of the battle process (Step S110). Namely, in accordance with the battle result and/or battle development by the battle process, the control section 11 updates and sets necessary information among the name of the player character who battles an enemy character, the name of the enemy character, battle development, battle result thereof, a parameter (or parameters) that defines the ability (or abilities) of the player character, and the like. The battle information includes various kinds of information on the battle such as the name of the player character who battles an enemy character, the name of the enemy character, battle development, battle result thereof, and a parameter that defines the ability of the player character. Then, the processing flow proceeds to Step S113.

In the case where the control section 11 receives instruction data for other instruction (that is, other instruction data: a command other than the movement or battle command) in accordance with the operation of the input section 21 by the player for executing other instruction (other operation) at Step S104 ("No" at Step S105, "No" at Step S108 and "Yes" at Step S111), the control section 11 executes a process (for example, conversation, purchase, pick up an object, or the like) in accordance with the other instruction data thus received (Step S112). Other information corresponding to the process result at Step S112 is then generated, and the processing flow proceeds to Step S113.

The control section 11 updates the current position of the player character by storing the movement information generated at Step S107 in a predetermined data area of the RAM 12 at Step S113. Further, the control section 11 memorizes and stores various action histories of the player character by storing the battle information generated at Step S110 and the other information generated after Step S112 in a predetermined data area of the RAM 12 at Step S113.

Subsequently, the control section 11 executes an action estimate process on the basis of information indicating the action histories of the player character once stored in the RAM 12 (Step S114). More specifically, information required to be digitized is digitized using conversion tables prepared in advance, and with respect to information required to be weighted, a score is calculated by multiplying predetermined numerical values and summing these multiplied numerical values. The calculated score is added to a previous score stored in a predetermined data area of the RAM 12, and the added score is again stored in the predetermined data area, by which the score is updated as estimate information.

Further, the control section 11 carries out determination of a display state of character identifying information for identifying each of the characters displayed in the character image of the image display screen 51 (Step S115). The processing at Step S115 will be described in detail.

Then, the control section 11 perspectively transforms the virtual three-dimensional space, including the player character P and the NPCs to be displayed from the virtual camera, onto the virtual screen in accordance with setting content of the virtual camera and/or the content determined at Step S115. The control section 11 carries out a display process to generate a two-dimensional image to be displayed on the image display screen 51 (Step S116). When the display process is terminated, this main process is terminated. Then, when timer interruption is generated at the time of a start of a next frame period, a next main process is carried out (that is, the main process is repeated). By repeatedly carrying out the main process, a character image is switched every frame period, and a moving image (animation) is displayed on the image display screen 51.

Now, the display process at Step S116 will be described. At Step S116, the control section 11 first transforms at least the coordinates of the vertexes of respective polygons included within a range to be perspectively transformed on the virtual screen among the coordinates of the vertexes of polygons constituting the virtual three-dimensional space in which the player character P and the three-dimensional NPCs are included from the coordinates of the world coordinate system to the coordinates of the viewpoint coordinate system. Subsequently, the control section 11 transmits the coordinates of the vertexes of polygons of the player character P and the NPCs in the viewpoint coordinate system to the graphics processor 15, thereby outputting a drawing or graphics command to the graphics processor 15.

When the drawing or graphics command is input to the graphics processor 15, the graphics processor 15 updates, on the basis of the coordinates of the viewpoint coordinate system, the content of the Z buffer so that data on the points that reside at the front side are retained with respect to points constituting each surface. When the content of the Z buffer is updated, the graphics processor 15 develops image data on the points that reside at the front side on the frame memory 19. Further, the graphics processor 15 develops image data indicating the character identifying information by the display state determined at Step S115 on a corresponding position of the frame memory 19. Moreover, the graphics processor 15 carries out some processes such as a shading process and a texture mapping process, for example, with respect to the developed image data.

Then, the graphics processor 15 in turn reads out the image data developed on the frame memory 19, and generates video signals by adding a sync signal to the image data to output the video signals to the display device 50. The display device 50 displays an image corresponding to the video signals output from the graphics processor 15 on the image display screen 51. By switching images displayed on the image display screen 51 every single frame period, the player can see images including the state in which the player character and/or the NPCs are moved on the field and perceive the images as moving images.

Figure 3:
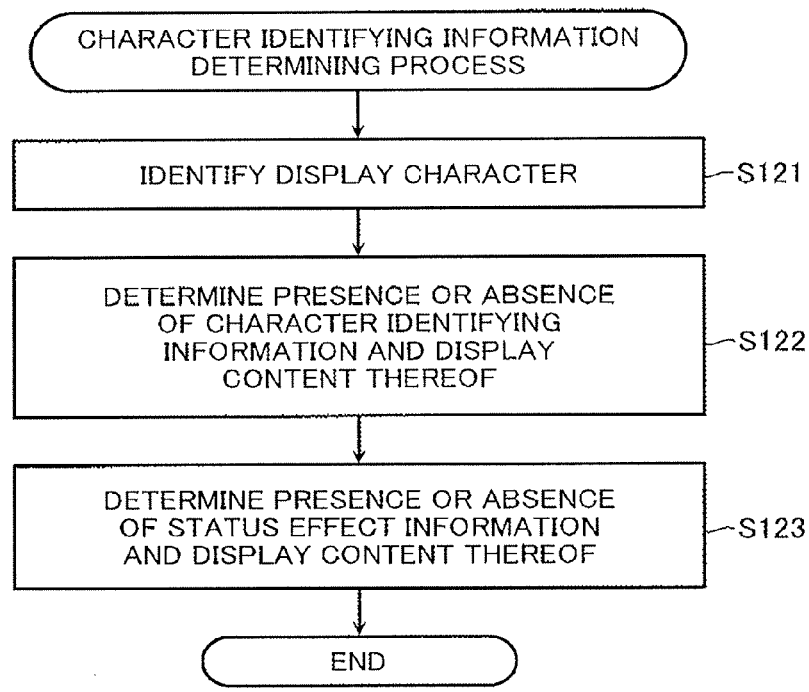
Figure 4:
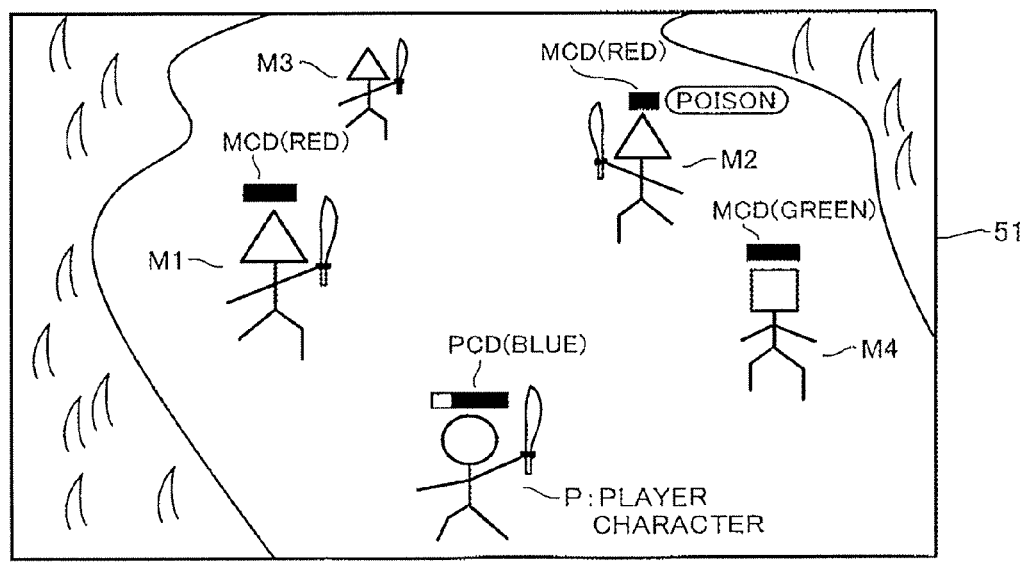
FIG. 4 is an explanatory drawing that shows an example of a character image displayed on an image display screen.

Next, a character identifying information determining process (Step S116) that may be executed on the video game apparatus 100 according to an aspect of the present embodiment will be described. FIG. 3 is a flowchart that illustrates an example of a process for determining character identifying information and the like in the video game apparatus 100 according to an aspect of the present embodiment. FIG. 4 is an explanatory drawing that shows an example of a character image displayed on the image display screen 51 in the video game according to an aspect of the present embodiment. An example of the character image in which a character identifying image indicating the character identifying information is displayed, is illustrated in FIG. 4.

A player character P and multiple non-player characters M1 to M4 are displayed in the character image illustrated in FIG. 4. In order to simplify the illustration in FIG. 4, the player character P is shown by a character whose head is a circular shape. Also, each of the enemy characters among the non-player characters is shown by a character whose head is an inverted triangle shape, and each of the neutral characters among the non-player characters is shown by a character whose head is a tetragon shape. The player character P and the respective non-player characters are actually shown as characters that imitate a human and/or an animal, for example, and characters formed as objects such as a vehicle. However, those skilled in the art will recognize that any manifestable object, sound, smell, or taste may be a character without departing from the scope or spirit of the invention.

Each part forming the player character P or each of the non-player characters M1 to M4 is constituted from, for example, multiple polygons, and the characteristic points (vertexes of the respective polygons) are indicated by coordinates of the local coordinate system. Namely, in an aspect of the present embodiment, the player character P or each of the non-player characters M1 to M4 is a three-dimensional character drawn by three-dimensional polygon data. In this regard, the player character P or each of the non-player characters M1 to M4 may be a two-dimensional character drawn by two-dimensional polygon data.

As illustrated in FIG. 4, the player character P is shown at a lower portion of the central position on the image display screen 51 in an aspect of the present embodiment. In this case, the player character P may be movable within a predetermined range of the lower portion of the central position on the image display screen 51. In the present embodiment, the player character P is constituted so as not to be movable to an upper side from a predetermined position of the lower portion of the central position on the image display screen 51. The positions of the respective vertexes of each polygon constituting the player character P are defined by identifying the positional relationship of each of the characteristic points by the local coordinate system, and transferring the coordinates of the characteristic points to the coordinates of the world coordinate system.

The non-player characters M1 to M3 among the multiple non-player characters shown in FIG. 4 are enemy characters each of which prevents action, or the like, of the player character P. Even though the player character P may not attack such an enemy character M1 to M3, each of them, however, may attack the player character P. On the other hand, the non-player character M4 is a neutral character that does not affect action and the like of the player character P in principle. The non-player character M4 does not attack the player character P so long as the player character P does not attack the non-player character M4.

Each of the non-player characters is movable in accordance with the progress of the game in response to the control program. Namely, even when the player character P is not moved, one or more non-player character may be moved in the character image in response to the control program.

Further, each of the non-player characters may newly appear on a character image from the outside of the character image (that is, outside the image screen), disappear from the character image, and be moved to the outside of the image display range. Moreover, each of the non-player characters may have the same shape as each other. Alternatively, a part, or all, of the non-player characters may have different shapes, respectively.

The image in which the player character P and/or the multiple non-player characters M1 to M4 are movable on the field in the virtual three-dimensional space is displayed on the image display screen 51 by perspective-transforming the virtual three-dimensional space by means of the virtual camera, whereby the player of the game recognizes such an image. The image projected on a virtual screen from the virtual camera positioned in the virtual three-dimensional space becomes the image displayed on the image display screen 51. A viewpoint coordinate system may be used to project an image on the virtual screen. For this reason, the coordinates of the world coordinate system are to be transformed to the coordinates of the viewpoint coordinate system.

In the case where an image projected on the virtual screen is generated by means of a perspective transformation, there is a need to carry out hidden surface removal that removes a surface of the object hidden by another object placed in the front thereof. In the present embodiment, a Z buffer method is used as the hidden surface removal method. Namely, when the control section 11 transforms the coordinates of the world coordinate system to the coordinates of the viewpoint coordinate system, the control section 11 informs the graphics processor 15 of the coordinates of the respective characteristic points and outputs the drawing or graphics command thereto. On the basis of this drawing or graphics command, the graphics processor 15 updates the content of the Z buffer so that data on the points that reside at the front side are retained with respect to the respective characteristic points, and develop the image data on the characteristic points on the frame memory 19 for every update.

In the character identifying information determining process, the control section 11 first identifies the characters displayed on the image display screen 51 on the basis of current position information of each character updated and stored in the predetermined data area of the RAM 12 at Step S113 (Step S121). In an aspect of the present embodiment, the current position information of each character is set in an information table for characters existing in a field (to be described later), and each character displayed in the character image is identified by confirming the current position information of the character set in the information table for characters existing in a field.

The information table for characters existing in a field is a table provided in every field that is used in the video game, and setting data are appropriately updated in accordance with the progress of the video game (which are updated at Step S113 in the present embodiment).

For example, as shown in FIG. 5, character information on each character existing in the corresponding field is set in the information table for characters existing in a field. More specifically, as shown in FIG. 5, the character information includes various kinds of information such as a name of each character, a maximum HP of each character and a current remaining HP of the character, a maximum MP (Magic Point) and a current remaining MP of the character, the current position of the character, information on whether or not the character is a character that the player character P can specify as an action target, a property or properties of the character (such as a characteristic property), and a status effect affecting the character.

Here, a character A (which is the player character P), a character D, a character E, a character F and a character G are identified at Step S121. In this regard, in the example shown in FIG. 5, although there are characters each having a property of "friend" in addition to the player character P, they are omitted in order to simplify the explanation.

Subsequently, the control section 11 determines, with respect to each of the characters identified at Step S121, the presence or absence of the display of character identifying information and a display content thereof on the basis of the information table for characters existing in a field (Step S122).

In the present embodiment, the control section 11 determines that characters that may be an action target of the player character P are to be displayed. Namely, it is determined that character identifying information of each of characters positioned within a predetermined distance from the player character P, where the player character P can specify them for action targets thereof among the enemy characters, are displayed and character identifying information of each of the other characters positioned outside the predetermined distance from the player character P, where the player character P cannot specify them for action targets thereof among the enemy characters are not displayed. More specifically, by referring to the column "Availability of Action Target" in the information table for characters existing in a field, characters for which "Available" is inserted in the column are determined as characters whose character identifying information is to be displayed. Each of the rows in the column "Availability of Action Target" is updated in accordance with the distance between the player character P and each of the characters at Step S113.

Further, with respect to the characters whose character identifying information is determined to be displayed, the display content of the character identifying information is determined in accordance with the maximum HP, the current remaining HP and the property of each of the characters. In the present embodiment, a display color of the character identifying information is determined in accordance with the property of the corresponding character. The degree of filling of a physical strength gauge of the character in the character identifying information for indicating the remaining rate of the HP thereof is determined in accordance with the maximum HP and the current remaining HP of the character.

In this case, among the character A, the character D, the character E, the character F and the character G identified at Step S121, it is determined at Step S122 that the character identifying information of the character G whose "Available of Action Target" is "no available" is not to be displayed. It is also determined that the character identifying information of each of the characters D, E and F whose "Available of Action Target" is "available" may be displayed. In this regard, it is determined that the character identifying information of the character A that is the player character P is always displayed.

It is determined that with respect to the character A the character identifying information is displayed by the physical strength gauge filled with blue, including a degree of filling that corresponds to the rate of the HPs because the property of the character A is "friend" and the rate of the HPs thereof is 200/350. Further, it is determined that with respect to the characters D and E, for example, the character identifying information of each of the characters D and E is displayed by a physical strength gauge wholly filled with red because the property of each of the characters D and E is "enemy" and the rate of the HPs thereof is 80/80. Moreover, it is determined that with respect to the character G, for example, the character identifying information thereof is displayed by a physical strength gauge wholly filled with green because the property of the character G is "neutral" and the rate of the HPs thereof is 100/100.

Subsequently, when the character identifying information is displayed, the control section 11 further determines whether status effect information is displayed or not and a display content thereof in the case where the status effect information is to be displayed (Step S123).

In an aspect of the present embodiment, it is determined that the status effect information indicating the status effect of the character is displayed with respect to the character that is affected by the status effect. More specifically, by referring to the column "STATUS EFFECT" in the information table for the characters existing in a field with respect to the characters whose character identifying information is determined to be displayed, it is determined that the status effect information with respect to the character is displayed in the case where any status effect is set for the character. Each of the rows in the column "STATUS EFFECT" is updated in accordance with, for example, the battle information at Step S113. In this regard, in the case where there are multiple status effects that affect the character, the status effect information indicating a part of the multiple status effects may be displayed. The status effect information indicating all the multiple status effects may be displayed separately or collectively.

In this case, since only the character E is affected by the status effect, it is determined that only the status effect information of the character E is displayed, and that, for example, a figure (status effect image) that is a status effect indicating "poison" is displayed as the status effect information.

As described above, by determining the presence or absence of the display of the character identifying information and the display content thereof, and the presence or absence of the display of the status effect information and the display content thereof, the character image as shown in FIG. 4, for example, is finally displayed through the process at Step 5116.

Namely, as shown in FIG. 4, a character identifying image PCD indicating the character identifying information is displayed above the head of the character A (player character P). The character identifying image PCD shows that the property of the character A is "friend" by the display color (blue), and indicates the remaining ratio of the HP by the degree of filling of a physical strength gauge thereof. Further, a character identifying image MCD indicating the character identifying information is displayed above the head of each of the character D (enemy character M1) and the character E (enemy character M2). This character identifying image MCD shows that the property of each of the characters D and E is "enemy" by the display color (red), and indicates the remaining ratio of the HP by the degree of filling of a physical strength gauge thereof. Moreover, a character identifying image MCD indicating the character identifying information is displayed above the head of the character G (enemy character M4). This character identifying image MCD shows that the property of the character G is "neutral" by the display color (green), and indicates the remaining ratio of the HP by the degree of filling of a physical strength gauge thereof. In this regard, since the character F (enemy character M3) is a character that the player character A (player character P) cannot specify for an action target, character identifying information is not displayed above the head of the character F. Further, the display position of the character display information is not limited to the position above the corresponding character, but may be at any other location, so long as it is within a vicinity of the corresponding character. Moreover, the display state of the character display information may be another state other than "POISON".

Further, as shown in FIG. 4, the status effect image indicating the status effect information (an image indicating that the corresponding character is affected by poison) is displayed at the side of the character identifying image MCD displayed above the head of the character E (enemy character M2). In this regard, the display position of the status effect image is not limited to the side of the character identifying image, but, may be located in any other position so long as the display position is in the vicinity of the character identifying image. Moreover, the display state of the status effect image may be other state, or plural states, other than the example of "POISON" used here for illustrative purposes.

Figure 6:
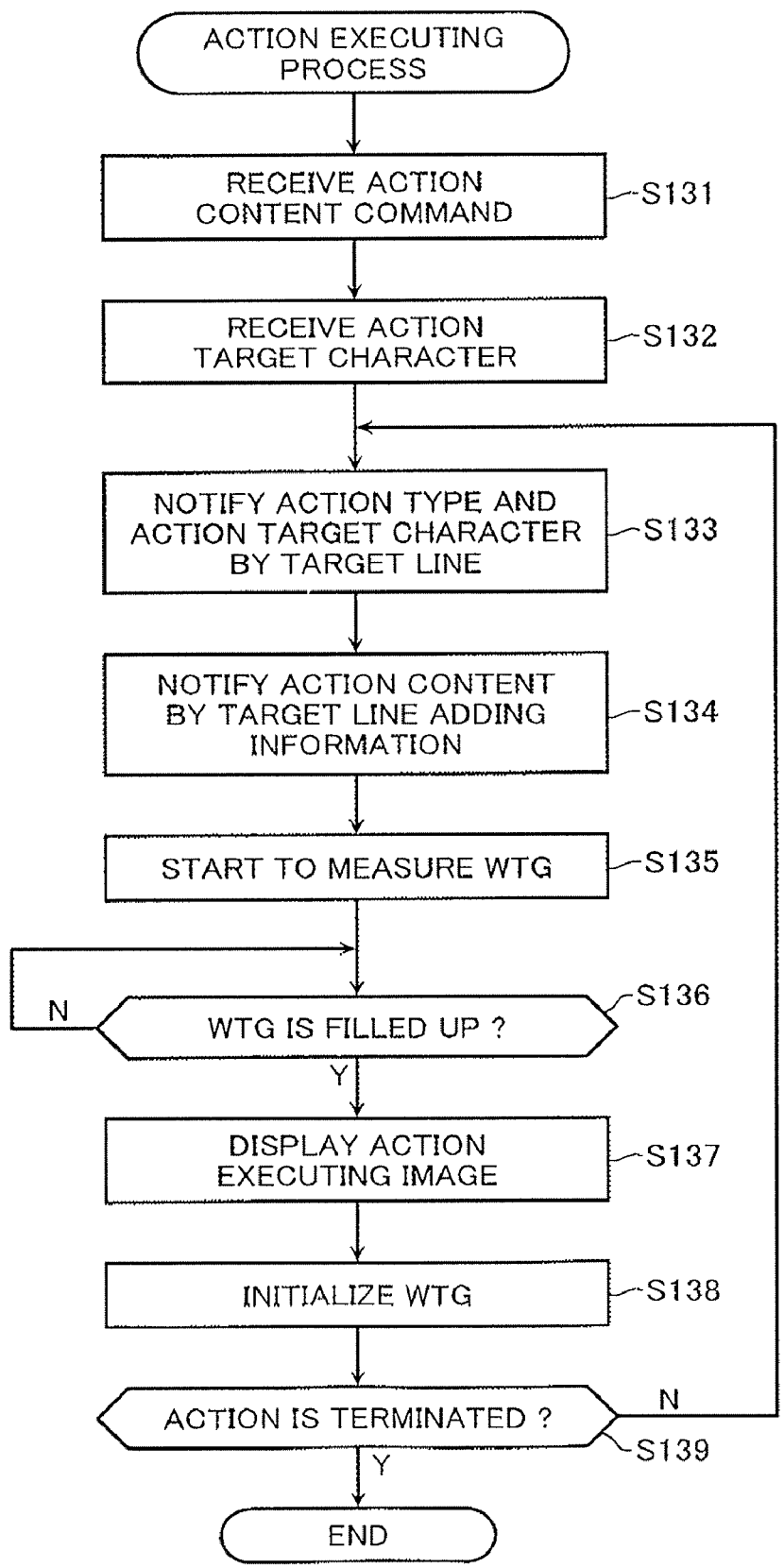
FIG. 6 is a flowchart that illustrates an example of an action executing process.

Next, an action executing process in the video game apparatus 100 according to an aspect of the present embodiment will be described. FIG. 6 is a flowchart that illustrates an example of the action executing process in the video game apparatus 100. The action executing process shown in FIG. 6 is achieved by executing the main process as described above repeatedly.

In the action executing process, the control section 11 first receives an action content command (Step S131). The action content command may include, for example, a movement command, a battle command, and/or other command. Here, for example, a battle command is received at Step S131. The battle command is a command specifying the kind of action (for example, attack, defense, recovery and the like) and the content of the action (for example, attack with a sword, defense with a shield, recovery by medicine). In this regard, the process at Step S131 corresponds to that at Step S104 in the main process.

When the control section 11 receives, for example, the action content command, the control section 11 also receives an action target character (Step S132) because the received action content command is a battle command that requires a player to specify an action target. In this case, the action target character is specified by the battle command. In this regard, the process at Step S132 corresponds to that at Step 104 in the main process.

When the action content command and the action target character are received, the control section 11 and the graphics processor 15 carry out the control to display a target line for beforehand notifying a player of a category or kind of action in the action content specified by the action content command and a character that the player character P specifies as the action target (Step S133). In this regard, the process at Step S133 corresponds to that at Steps S109 to S114 and S116 in the main process.

The target line TL is displayed by the process at Step S133 as shown in FIG. 7, for example. In FIG. 7, the target line TL as displayed when the action content of "attack with a sword", for example, is specified by the action content command and the enemy character M1 is specified as the action target as shown. In this way, by viewing an image in which a line (target line TL) is in turn drawn from the player character P (attacking entity) to the enemy character M1 (action target) continuously or intermittently, a player of the video game can recognize the action entity and the action target immediately.

In an aspect of the present embodiment, as shown in FIG. 8, whether an action that will be carried out from now is attack, "supplemental attack", or "recover" can be recognized by the color of the displayed target line TL. Thus, by viewing an image in which the target line TL is drawn, the player can immediately recognize the category or kind of action that will be executed in addition to the action entity and the action target. In this regard, the category or kind of action may be distinguished by different line styles or line widths without using the colors of the target line TL. Furthermore, for more complex commands, any combination of colors, styles and/or widths may be used as will be readily recognized by those skilled in the art without departing from the scope or spirit of the invention.

In this regard, the target line TL is not limited to the curved line as shown in FIG. 7, but it may be other type of lines (line styles) such as a straight line and/or a wavy line.

Further, the control section 11 and the graphics processor 15 carry out the control process to display target line adding information for notifying a player of the action content specified by the action content command (Step S134). In this regard, the process at Step S134 corresponds to that at Steps S109 to S114 and S116 in the main process.

The target line adding information AD, for example, is displayed along with the target line TL by the process at Step S134 as shown in FIG. 7, for example. In FIG. 7, the action content of "attack with a sword" is specified by the action content command, and the target line adding information AD is shown along with the target line TL, for example, when the enemy character M1 is specified as the action target. The target line adding information AD is shown as an image illustrating "attack with a sword", which is the action content specified by the action content command. In an aspect of the present embodiment, an image of a sword is displayed along with the target line TL as the target line adding information AD. In this way, by viewing an image in which a line (target line TL) is drawn from the player character P (attacking entity) to the enemy character M1 (action target) and the target line adding information AD is displayed along with the target line TL, the player of the video game can immediately recognize the action content in addition to the action entity and the action target. However, the display position and the display state of the target line adding information are not limited the example illustrated in FIG. 7, but may be manifested in any other position, form, or color, or any combination thereof, as will be readily appreciated by those skilled in the art, without departing from the scope or spirit of the invention.

When the target line TL and the target line adding information AD are displayed, the control section 11 and the graphics processor 15 start to measure time by means of a wait time gauge (WTG: a gauge for measuring time until an action can be carried out) (Step S135). When a scale of the WTG is filled up (Step S136), the control section 11 and the graphic processor 15 carry out the control process to display an action executing image in which the action specified by the action content command is executed against the action target character thus received (Step S137). For example, an image indicating a state that the player character P attacks the enemy character M1 with a sword may be displayed as an action executing image. In this regard, the WTG is also referred to as an active time gauge (ATG).

When the action executing image is displayed, the control section 11 initializes the WTG (Step 5138). Then, in the case where the action is terminated, the processing flow returns to Step S133 (Step S139). In the case where any one of predetermined conditions is met, it is determined that the action is terminated. The predetermined conditions may include a condition that the HP of the enemy character as the action target becomes zero, a condition that a new action content command is received, a condition that a new action target command is received, and/or a condition that a dash instruction command is received.

In this case, when the processing flow returns to Step S133, for example, the target line TL and the target line adding information AD that have the same aspect as the previous ones are displayed again, and the processes after Step S135 are carried out.

As described above, in an aspect of the present embodiment, a battle may be carried out by a battle system, which is referred to as an active time battle (ATB) using the WTG (or ATG), on the field where a movement field is seamless to a battle field (the battle field is mixed with the movement field). Namely, for example, when the player character starts to attack an enemy character found in the field during movement (that is, movement field), a battle is started. Further, a battle may also be started when an enemy character found in the field during movement starts to attack the player character. In this regard, the player character may receive an attack from an enemy character that is not displayed in the character image (that is, an enemy character that is not displayed on the image display screen 51 because it is positioned, for example, behind the player character when the player character face the back side of the image display screen 51). In an aspect of the present embodiment, the player character may receive an attack from such an enemy character after a target line is displayed. In such a case, a battle is also started when the player character receives such an attack.

As explained above, in the embodiment described above, since the video game processing apparatus is constructed so that character identifying information may be displayed only in the vicinity of each of the characters that the player character can specify as an action target among the characters displayed in the character image, it is possible for the player to recognize the state of the characters only by confirming presence or absence of character identifying information. Thus, even though multiple characters are displayed in a common field in which movement and a battle are carried out, each of the characters can be displayed so as to be easily distinguished by the player. Therefore there is no requirement that movement and a battle are respectively carried out in separate fields, and it is thereby possible to prevent realism (realistic sensation) from being lowered due to a change of fields. For this reason, the video game can proceed smoothly.

For example, in the case where the character identifying information is not displayed in the vicinity of a character that is displayed in the character image, the player can immediately recognize that the character is a character that the player character cannot specify as an action target. Further, for example, when a character in the vicinity of which character identifying information is not displayed, approaches the player character and the character identifying information thereof is displayed, it is possible for the player to immediately recognize that the character can become an action target. Therefore, it is possible for the player to easily recognize whether or not other characters existing in the character image can be specified as an action target (for example, attacking target), such as in an example, when the player character is moved in the field.

Further, in the embodiment described above, since the video game processing apparatus is constructed so that the property of each of the characters (for example, friend, enemy and neutral) is notified by a display state of the character identifying information, it is possible to make for the player to easily recognize the property of each of the characters.

Moreover, in the embodiment described above, since the video game processing apparatus is constructed so that the remaining ratio of HP is notified by the display state of the character identifying information, it is possible for the player to recognize the remaining ratio of the HP of each of the characters.

Furthermore, in the embodiment described above, since the video game processing apparatus is constructed so that an action content command and an action target character are received and a target line for beforehand notifying a player that a character as an action target is displayed, it is possible for the player to immediately recognize an action entity and an action target.

Further, in the embodiment described above, since the video game processing apparatus is constructed so that the category or kind of action among the action content specified by the action content command is notified by a display state of the target line (for example, color and line style), it is possible for the player to immediately recognize the category or kind of action, in addition to the action entity and the action target.

Moreover, in the embodiment described above, since the video game processing apparatus is constructed so that target line adding information for notifying the action content specified by the action content command is displayed, it is possible to make the player recognize the action content in addition to the action entity and the action target immediately.

In this regard, in the embodiment described above, a case of receiving an action content command that is required to identify an action target character in the action executing process (see FIG. 6) has been described. In the case of receiving an action content command that is not required to specify an action target character (for example, a dash instruction command), an action executing image in accordance with the action content command is displayed at Step S137 without carrying out the processes at Steps S132 to S136, and the processing flow is terminated without carrying out the processes at Steps S138 and S139.

Figure 9:
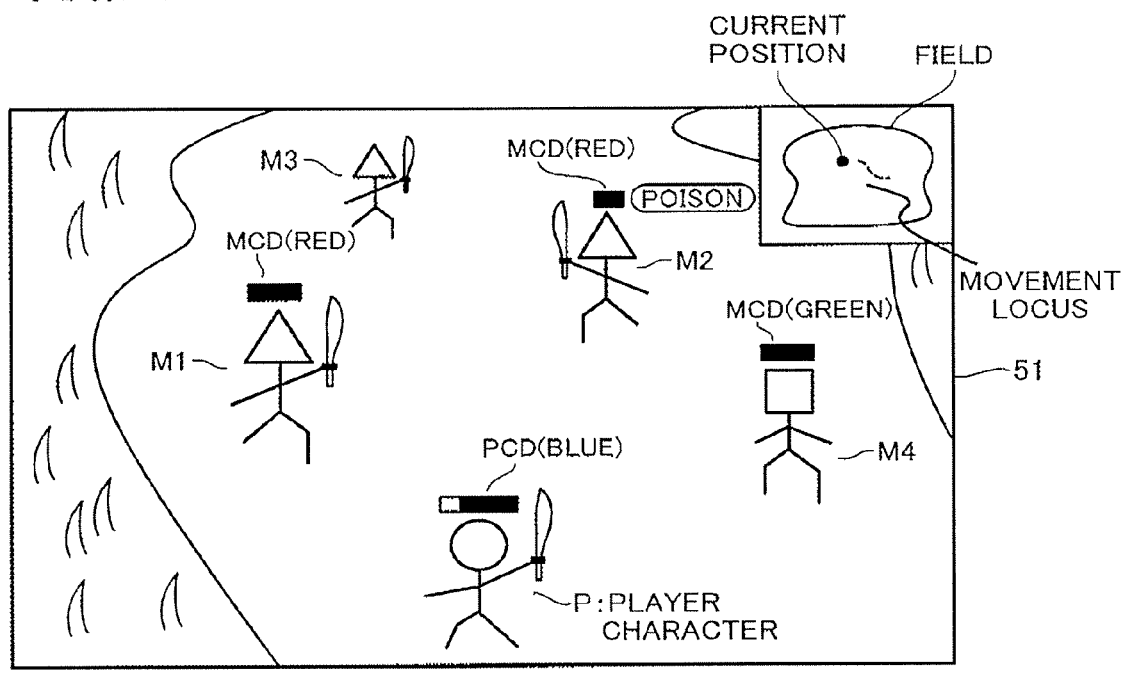
FIG. 9 is an explanatory drawing that shows an example of a display state of movement locus of a player character displayed on a character image.

Further, although it is not particularly referred to in the embodiment described above, for example, as shown in FIG. 9, the shape of the whole field where the player character is acting and the current position of the player character in the field may be displayed in a part of an area in the character image (for example, upper right-hand area) as a global map of the field, including all of the characters, and a locus of the movement (movement locus) of the player character may be displayed by a predetermined distance using a dotted line, for example. By constructing the video game processing apparatus in this manner, it is possible to allow the player to easily recognize where the player character is positioned in the overall field, and which direction the player character is moved toward.

Moreover, although it is not particularly referred to in the embodiment described above, for example, the control section 11 may determine that an action content is a back attack in the case where an action content command for attack is received during a state where the player character is moved to the back of an enemy character (see Step S131) and the enemy character is selected (received) as an action target character (see Step S132). This is because the video game proceeds in a common field where a movement field is seamless to a battle field. In the case where the control section 11 determines that an action content is a back attack, the process is controlled so that damage to the enemy character by the back attack may become greater than that by a normal attack (not back attack), for example. By constructing the video game processing apparatus in this manner, it is possible to vary the effect of an attack in accordance with a position of the player character during a battle with respect to an enemy character, and this makes it possible to increase variations in a method of playing the video game during a battle. In addition, since the player can carry out the back attack by his or her skill, it is possible to increase the player's interest.

Furthermore, although it is not particularly referred to in the embodiment described above, in a similar manner to the player character, when an action to be carried out and the target are determined, time measurement is started by the WTG after displaying a target line toward the target, and the action is carried out when the WTG is filled up. Namely, for example, when the enemy character attacks the player character, the state that the enemy character attacks the player character is displayed after the target line is displayed from the enemy character to the player character. In this regard, it is preferable that the color, line style or the like of a target line is different from each other among a target line displayed from the player character to an enemy character, a target line displayed from an enemy character to the player character, and a target line displayed from the player character to other friend character.

Further, although it is not particularly referred to in the embodiment described above, for example, multiple target lines or one target line may be displayed toward multiple action target characters or one action target character representative of multiple action target characters at Step S133 in the case where an action content command is received (see Step S131) and multiple characters are received as the multiple action target characters (see Step S132). On the other hand, even if one character is received as an action target character (see Step S132), an attack influences the action target character and other characters positioned around the action target character in the case where the received attack is, for example, an attack influencing a wide range. In this case, a target line is displayed toward the action target character at Step S133, as well as a state that the attack influences the action target character and other characters positioned around the action target character at Step S137.

Moreover, although the video game apparatus main body 10 and the display device 50 are constructed from separate components in the embodiment described above, the display device 50 may be incorporated in the video game apparatus main body 10.

Furthermore, although one example of a game control for the RPG has been described in the embodiment described above, the technique of the present invention can be applied to other kinds of video games that include multiple characters in a screen of such a video game, as those skilled in the art will readily recognize without departing from the scope of spirit of the invention.

Further, although an aspect of the invention has been described with the video game apparatus 100 as an example, the present invention is not limited thereto. The present invention can be applied to various apparatuses such as a personal computer, a cellular phone terminal, a portable game apparatus and/or the like as long as such an apparatus has an image generating function. In this regard, in the case where the present invention is applied to a portable game apparatus or the like, a small-sized storage medium such as a semiconductor memory card may be used as the storage medium 70 described above in place of a CD-ROM or DVD-ROM, or any other type of storage medium as those skilled in the art will appreciate without departing from the scope or spirit of the invention.

Moreover, in the embodiment described above, although it has been described that game data for making the video game apparatus main body 10 (video game apparatus 100) to carry out various processes described above (that is, various data such as control program data used for the game) are stored in the storage medium 70, the game data may be delivered by a server apparatus such as a network server (WWW server), or other computer device connected (either wired or wireless) to a network, such as the Internet, a local area network, a wide area network, or the like, or any combination thereof. In this case, the video game apparatus main body 10 may obtain the game data delivered by the server apparatus via the communication network 80, and store the game data in the HDD 13. The game data may be used by being loaded on the RAM 12 from the HDD 13. In this regard, although the game data are explained in the above example, such data may include at least control program data for making a computer to carry out the image generating process in the embodiment as described above.

The present invention can be applied to a video game machine, a personal computer, a cellular phone terminal, a portable game apparatus, or the like, or any combination thereof that causes an image display apparatus to display multiple characters including a player character on an image display screen, and controls an action of each of the multiple characters displayed on the image display screen in response to an operation by a player. Therefore, the present invention is useful.

The illustrations of the embodiments described herein are intended to provide a general understanding of the structure of the various embodiments. The illustrations are not intended to serve as a complete description of all of the elements and features of apparatuses and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope and spirit of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments that fall within the true spirit and scope of the present disclosure. Thus, to the maximum extent allowed by law, the scope of the invention is to be determined by the broadest permissible interpretation of the following claims and their equivalents, and shall not be restricted or limited by the foregoing detailed description.

Although several exemplary embodiments have been described, it is understood that the words that have been used are words of description and illustration, rather than words of limitation. Changes may be made within the purview of the appended claims, as presently stated and as amended, without departing from the scope and spirit of the invention in its aspects. Although the description refers to particular means, materials and embodiments, the invention is not intended to be limited to the particulars disclosed, but rather extends to all functionally equivalent structures, methods, and uses such as are within the scope of the appended claims.

What is claimed is:

1. A video game processing apparatus that causes an image display apparatus to display multiple characters of a video game, including a player character, on an image display screen of the image display apparatus, the video game processing apparatus controlling progress of the video game by controlling an action of each of the multiple characters to be displayed on the image display screen in accordance with operations by a player, the video game processing apparatus comprising:
   a character image display controller that causes the image display apparatus to display a character image in which the multiple characters existing within a field of view of a virtual camera in a field are drawn, various actions, including movement of the player character and a battle by the player character, being allowed in the field, and a same time base being applied to the multiple characters, including the player character, which exist in the field;
   an action target candidate identifying image drawer that draws an action target candidate identifying image in the character image displayed by the character image display controller, the action target candidate identifying image notifying that ones of the multiple characters that meet predetermined action target conditions are action target candidate characters;
   an action content receiver that receives a selection of an action content, from among a plurality of action contents, for the player character, at least one of the plurality of action contents requiring a selection of an action target character, from among the action target candidate characters, to be an action target of the at least one of the plurality of action contents, at least one of the plurality of action contents not requiring the selection of the action target character;
   an action target receiver that receives the selection of the action target character, from among the action target candidate characters, to be the action target when the action content received by the action content receiver requires the selection of the action target character;
   an action content beforehand notifying image drawer that draws an action content beforehand notifying image in the character image displayed by the character image display controller, the action content beforehand notifying image being drawn in response to the action content receiver receiving the selection of the action content and the action target receiver receiving the selection of the action target character, the action content beforehand notifying image beforehand notifying that the action content received by the action content receiver will be executed against the action target character received by the action target receiver; and
   an action content executing image drawer that draws an action content executing image in the character image displayed by the character image display controller, the action content executing image notifying an execute state in which the action content received by the action content receiver is executed against the action target character received by the action target receiver,
   wherein the action content beforehand notifying image is one of a straight line and a curved line that is drawn one of continuously and intermittently from a vicinity of the player character to a vicinity of the action target character, and
   wherein the action content beforehand notifying image drawer further draws an action content image in a vicinity of the one of the straight line and the curved line, the action content image indicating the action content.

2. The video game processing apparatus according to claim 1, wherein the action content executing image drawer draws the action content executing image that notifies the execute state of the action content received by the action content receiver only when the action content received by the action content receiver does not require the selection of the action target.

3. The video game processing apparatus according to claim 1, wherein the action target candidate identifying image includes a property for each of the action target candidate characters.

4. The video game processing apparatus according to claim 1, wherein the predetermined action target conditions are met when a distance between one of the multiple characters and the player character is within a predetermined distance.

5. The video game processing apparatus according to claim 1, wherein the action content beforehand notifying image notifies that the action content received by the action content receiver is one of a plurality of predetermined categories of action content.

6. The video game processing apparatus according to claim 5, wherein the one of the straight line and the curved line has a predetermined display state that indicates the one of the plurality of predetermined categories of action content.

7. The video game processing apparatus according to claim 1, wherein the action content beforehand notifying image indicates the action content received by the action content receiver.

8. The video game processing apparatus according to claim 1, wherein the video game is a role playing game,
the video game processing apparatus further comprising:
a time determiner that controls progress of the role playing game, and determines whether a predetermined period of time elapses from one of when the action target receiver receives the selection of the action target character and the action content receiver receives the selection of the action content, and when the action content beforehand notifying image drawer draws the action content beforehand notifying image,
wherein the action content executing image drawer draws the action content executing image when the time determiner determines that the predetermined period of time elapses.

9. A method of processing a video game by causing an image display apparatus to display multiple characters of the video game, including a player character, on an image display screen of the image display apparatus, the method controlling progress of the video game by controlling an action of each of the multiple characters to be displayed on the image display screen in accordance with operations by a player, the method comprising:
causing the image display apparatus to display a character image in which the multiple characters existing within a field of view of a virtual camera in a field are drawn, various actions, including the movement of the player character and a battle by the player character, being allowed in the field, and a same time base being applied to the multiple characters, including the player character, which exist in the field;
drawing an action target candidate identifying image in the character image, the action target candidate identifying image being used to notify that ones of the multiple characters, which meet predetermined action target conditions, are action target candidate characters;
receiving a selection of an action content, from among a plurality of action contents, for the player character, at least one of the plurality of action contents requiring a selection of an action target character, from among the action target candidate characters, to be an action target of the at least one of the plurality of action contents, at least one of the plurality of action contents not requiring the selection of the action target character;
receiving the selection of the action target character, from among the action target candidate characters, to be the action target when the action content requires the selection of the action target character;
drawing an action content beforehand notifying image in the character image, the action content beforehand notifying image drawn in response to receiving the selection of the action content and receiving the selection of the action target character, the action content beforehand notifying image beforehand notifying that the action content will be executed against the action target character; and
drawing an action content executing image in the character image, the action content executing image notifying an execute state in which the action content is executed against the action target character,
wherein the action content beforehand notifying image is one of a straight line and a curved line that is drawn one of continuously and intermittently from a vicinity of the player character to a vicinity of the action target character, and
wherein the drawing an action content beforehand notifying image includes drawing an action content image in a vicinity of the one of the straight line and the curved line, the action content image indicating the action content.

10. The method according to claim 9, wherein the drawing the action content executing image includes drawing the action content executing image that notifies the execute state of the action content only when the action content does not require the selection of the action target.

11. The method according to claim 9, wherein the action target candidate identifying image includes a property for each of the action target candidate characters.

12. The method according to claim 9, wherein the predetermined action target conditions are met when a distance between one of the multiple characters and the player character is within a predetermined distance.

13. The method according to claim 9, wherein the action content beforehand notifying image notifies that the action content is one of a plurality of predetermined categories of action content.

14. The method according to claim 13, wherein the one of the straight line and the curved line has a predetermined display state that indicates the one of the plurality of predetermined categories of action content.

15. The method according to claim 9, wherein the action content beforehand notifying image indicates the action content.

16. The method according to claim 9, wherein the video game is a role playing game,
the method further comprising:
determining whether a predetermined period of time elapses from one of when the selection of the action target character and the selection of the action content are received, and when the action content beforehand notifying image is drawn,
wherein the action content executing image is drawn when it is determined that the predetermined period of time has elapsed.

17. A non-transitory computer program product for processing a video game, progress of the video game being controlled by causing an image display apparatus to display multiple characters of the video game, including a player character, on an image display screen of the image display apparatus, and controlling an action of each of the multiple characters to be displayed on the image display screen in accordance with operations by a player, the computer program product causing a computer to execute:

causing the image display apparatus to display a character image in which the multiple characters existing within a field of view of a virtual camera in a field are drawn, various actions, including a movement of the player character and a battle by the player character, being allowed in the field, and a same time base being applied to the multiple characters, including the player character, that exist in the field;

drawing an action target candidate identifying image in the character image, the action target candidate identifying image being used to notify that ones of the multiple characters that meet predetermined action target conditions are action target candidate characters;

receiving a selection of an action content, from among a plurality of action contents, for the player character, at least one of the plurality of action contents requiring a selection of an action target character, from among the action target candidate characters, to be an action target of the at least one of the plurality of action contents, at least one of the plurality of action contents not requiring the selection of the action target character;

receiving the selection of the action target character, from among the action target candidate characters, to be the action target when the action content requires the selection of the action target character;

drawing an action content beforehand notifying image in the character image, the action content beforehand notifying image drawn in response to receiving the selection of the action content and receiving the selection of the action target character, the action content beforehand notifying image beforehand notifying that the action content will be executed against the action target character; and drawing an action content executing image in the character image, the action content executing image notifying an execute state in which the action content is executed against the action target character, wherein the action content beforehand notifying image is one of a straight line and a curved line that is drawn one of continuously and intermittently from a vicinity of the player character to a vicinity of the action target character, and wherein the drawing an action content beforehand notifying image includes drawing an action content image in a vicinity of the one of the straight line and the curved line, the action content image indicating the action content.

18. The non-transitory computer program product according to claim 17, wherein the action target candidate identifying image includes a property of each of the action target candidate characters.

19. The non-transitory computer program product according to claim 17, wherein the action content beforehand notifying image notifies that the action content is one of a plurality of predetermined categories of action content.

20. The non-transitory computer program product according to claim 19, wherein the one of the straight line and the curved line has a predetermined display state that indicates the one of the plurality of predetermined categories of action content.

21. The non-transitory computer program product according to claim 17, wherein the action content beforehand notifying image indicates the action content.

22. The non-transitory computer program product according to claim 17, wherein the video game is a role playing game, and wherein the computer program product further causes the computer to execute:

determining whether or not a predetermined period of time elapses from one of when the selection of the action target character and the selection of the action content are received, and when the action content beforehand notifying image is drawn, wherein the action content executing image is drawn when it is determined that the predetermined period of time has elapsed.

\* \* \* \* \*